(12) United States Patent
Cathey

(10) Patent No.: US 11,199,308 B1
(45) Date of Patent: Dec. 14, 2021

(54) UNIVERSAL LIGHT BOX FOR A VEHICLE OR TRAILER

(71) Applicant: Larry Cathey, Valley Mills, TX (US)

(72) Inventor: Larry Cathey, Valley Mills, TX (US)

( * ) Notice: Subject to any disclaimer, the term of this patent is extended or adjusted under 35 U.S.C. 154(b) by 62 days.

(21) Appl. No.: 16/846,166

(22) Filed: Apr. 10, 2020

(51) Int. Cl.
| F21V 5/04 | (2006.01) |
| B60Q 1/30 | (2006.01) |
| F21V 21/08 | (2006.01) |
| F21V 15/01 | (2006.01) |

(52) U.S. Cl.
CPC .............. *F21V 5/043* (2013.01); *B60Q 1/305* (2013.01); *F21V 15/01* (2013.01); *F21V 21/08* (2013.01)

(58) Field of Classification Search
CPC .......... F21V 5/043; F21V 15/01; F21V 21/08; B60Q 1/305; B60Q 1/30
USPC .......... 362/362, 367, 368, 485, 546
See application file for complete search history.

(56) References Cited

U.S. PATENT DOCUMENTS

| 3,935,445 | A | * | 1/1976 | Preisler | .................. | B60Q 1/30 |
| | | | | | | 362/355 |
| 4,466,050 | A | * | 8/1984 | Lockard | .................. | G09F 13/04 |
| | | | | | | 362/307 |
| 4,611,265 | A | * | 9/1986 | Davis | ...................... | G09F 13/04 |
| | | | | | | 362/145 |
| 5,727,865 | A | * | 3/1998 | Caldwell | ................ | B60Q 1/305 |
| | | | | | | 362/368 |
| 2005/0286257 | A1 | * | 12/2005 | Trimmer | ................. | G09F 21/04 |
| | | | | | | 362/485 |
| 2006/0092659 | A1 | * | 5/2006 | Bynum | .................... | B60Q 3/51 |
| | | | | | | 362/549 |

FOREIGN PATENT DOCUMENTS

| KR | 101166474 B1 * | 7/2012 | |
| WO | WO-2012025908 A1 * | 3/2012 | ............... B60Q 1/30 |

* cited by examiner

*Primary Examiner* — Laura K Tso

(74) *Attorney, Agent, or Firm* — Plager Schack LLP; Mark H. Plager; Kara Verryt

(57) ABSTRACT

A universal light box for mounting a light to either side of a trailer or vehicle may include a first U-shaped element engaged with a second U-shaped element, the elements together forming a substantially rectangular light box. A front surface of the light box may include a second lens orifice, and a first side surface of the light box may include a first lens orifice. Both the top and bottom surfaces may include mounting tabs. The top and bottom surfaces may be sized to extend past the front surface and the side surface to provide extension lips for protection purposes.

9 Claims, 5 Drawing Sheets

UNIVERSAL LIGHT BOX FOR A VEHICLE OR TRAILER

BACKGROUND

The embodiments herein relate generally to a vehicle accessories, and more particularly, to a universal light box for vehicles or trailers.

Existing light boxes are not universal, meaning they cannot be placed on either side of a trailer or vehicle. As such, with existing light boxes, the light cannot be moved to either side of the trailer or vehicle.

Therefore, what is needed is a light box that is universal to help improve the way lights are displayed and where they are placed on a trailer or vehicle.

SUMMARY

Some embodiments of the present disclosure include a universal light box for mounting a light to either side of a trailer or vehicle. The light box may include a first U-shaped element engaged with a second U-shaped element, the elements together forming a substantially rectangular light box. A front surface of the light box may include a second lens orifice, and a first side surface of the light box may include a first lens orifice. Both the top and bottom surfaces may include mounting tabs. The top and bottom surfaces may be sized to extend past the front surface and the side surface to provide extension lips for protection purposes

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a universal light box for a vehicle or trailer and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the device of the present disclosure may be related in the following exemplary fashion. It is not intended to limit the scope or nature of the relationships between the various elements and the following examples are presented as illustrative examples only.

By way of example, and referring to FIGS. 1-9, some embodiments of the present disclosure include a universal light box 10 for mounting a light to a trailer or vehicle 11, the universal light box 10 comprising a top surface, a bottom surface, a front surface, a rear surface, and two side surfaces, which together may form a substantially rectangular light box 10. As shown in the Figures, the top surface and the bottom surface may extend outwards past the front surface, resulting in a lip extending outward past both the top and bottom edge of the front surface.

Figure 4:
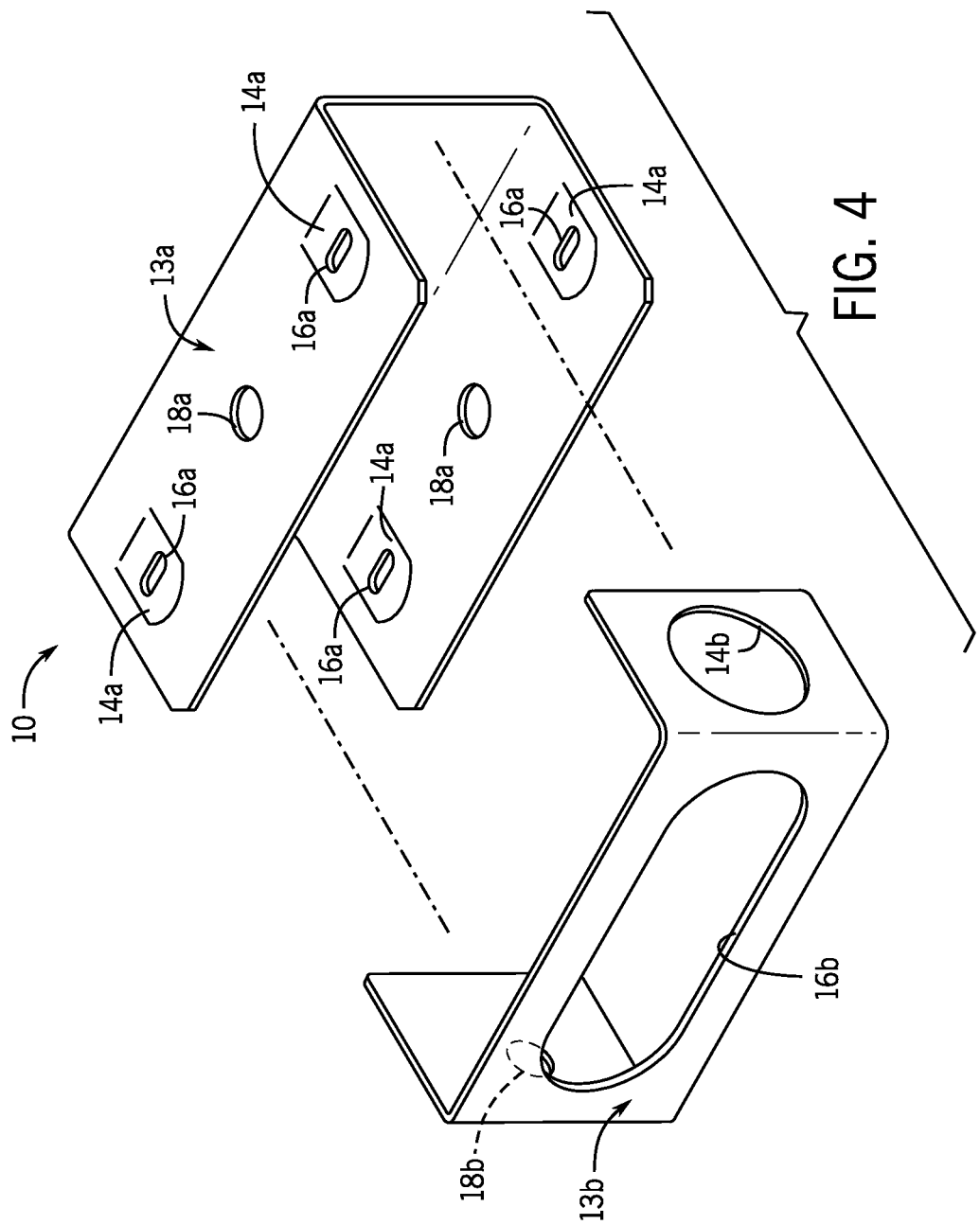
FIG. 4 is an exploded perspective view of one embodiment of the present disclosure.
Figure 5:
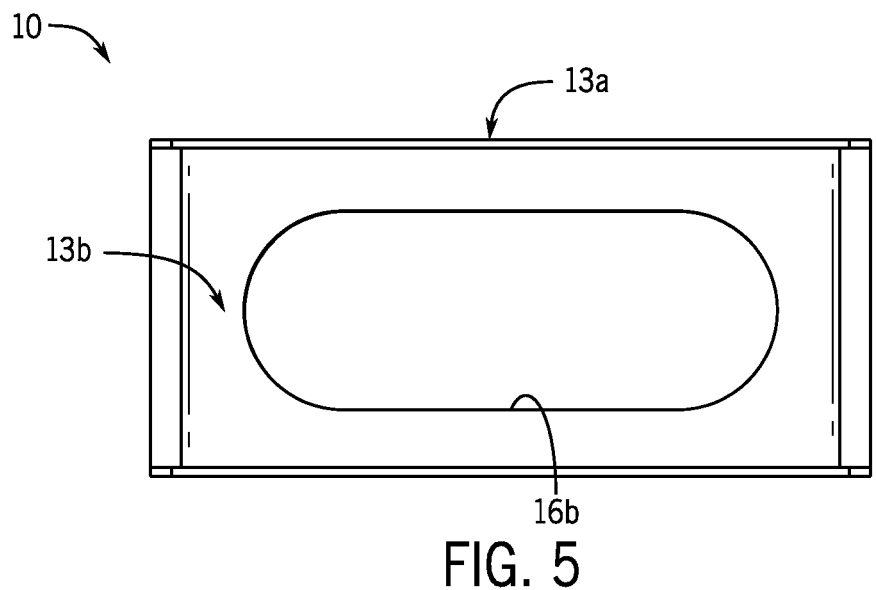
FIG. 5 is a rear elevation view of one embodiment of the present disclosure.
Figure 6:
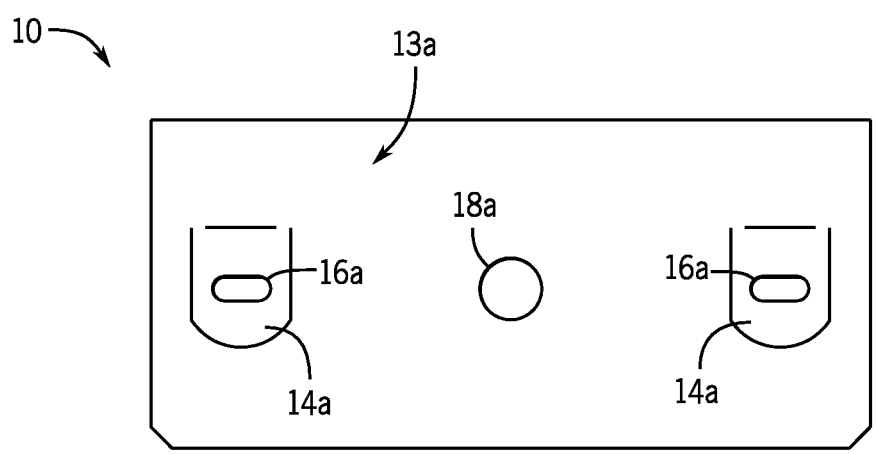
FIG. 6 is a top plan view of one embodiment of the present disclosure.
Figure 7:
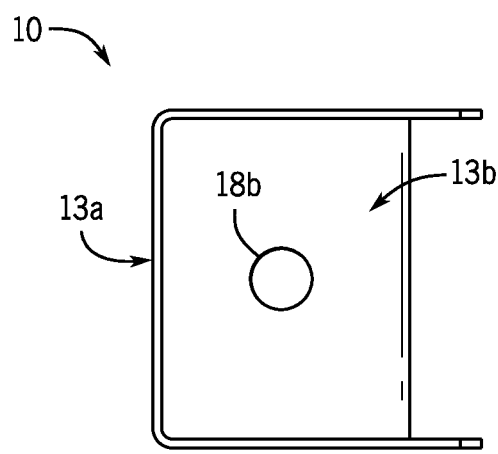
FIG. 7 is a right side elevation view of one embodiment of the present disclosure.
Figure 8:
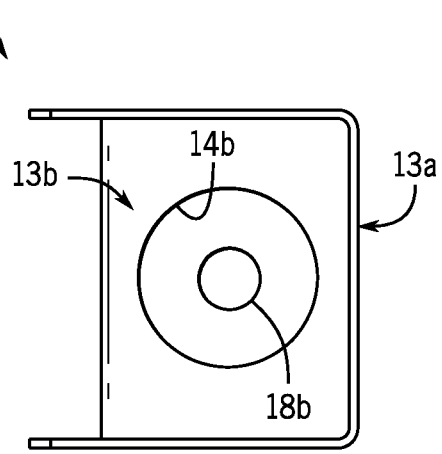
FIG. 8 is a left side elevation view of one embodiment of the present disclosure.
Figure 9:
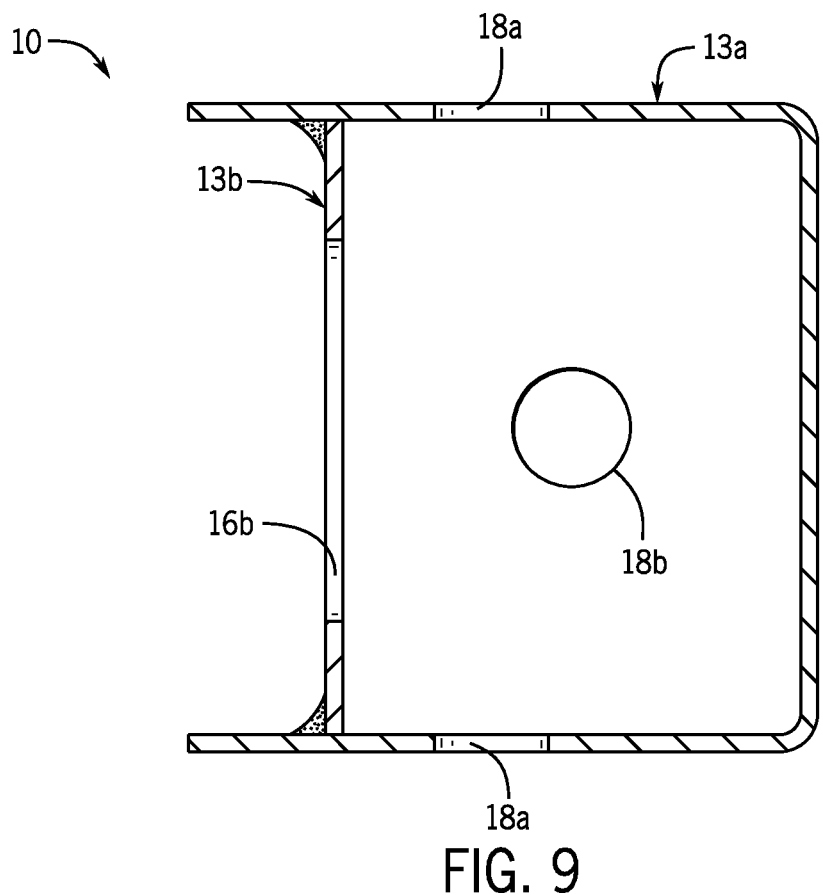
FIG. 9 is a cross-sectional view of one embodiment of the present disclosure, taken along line 9-9 in FIG. 3.

In some embodiments, and as shown in the Figures, the light box 10 may comprise a first substantially U-shaped element 13a comprising the top surface, the bottom surface, and the rear surface, wherein the top surface is substantially parallel to the bottom surface, and the rear surface connects the rear edge of the top surface to the rear edge of the bottom surface. The light box 10 may further comprise a second substantially U-shaped element 13b comprising the front surface and the two side surfaces, wherein a first side surface is parallel to a second side surface and a front edge of the first side surface may be attached to a front edge of the second side surface by the front surface. A height of the front surface and the two side surfaces of the second U-shaped element 13b may be substantially equal to the distance between the top surface and the bottom surface of the first U-shaped element 13a, such that the second U-shaped element 13b fits into the first U-shaped element 13a, as shown in FIG. 4.

As shown in the Figures, both the top surface and the bottom surface of the first U-shaped element 13a (and thus, both the top surface and the bottom surface of the light box 10) may each be a substantially elongate rectangle in shape and may each have a pair of mounting tabs 14a built therein. Each mounting tab may comprise a tab slot 16a extending therethrough. As shown in, for example, FIG. 2, when the light box 10 is mounted to the rear of a vehicle 11, the mounting tab 14a is bent away from the top or bottom surface of the light box 10, forming a deployed mounting tab 14a'. A mounting bolt 15 or any other desired fastener may be used to attach the light box 10 to the rear of the vehicle 11 by passing through the tab slot 16a and engaging with the rear of the vehicle 11. The top surface and the bottom surface of the first U-shaped element may each also comprise a first element orifice 18a. As shown in the Figures, the first element orifice 18a may comprise a substantially circular and centrally positioned orifice. Because the light box 10 may be mounted by either positioning the top surface or the bottom surface upwards against the rear of the vehicle 11, the top surface and the bottom surface may be identical. As a result, the light box 10 is universal, meaning that it can be mounted on either side of the vehicle or trailer.

As described above, the second U-shaped element 13b may comprise the front surface and the two side surfaces wherein the front surface is defined as the surface of the light box 10 that is designed to be seen from a position behind the rear of the vehicle 11. The front surface may comprise a substantially elongate rectangular shape, wherein a length of the front surface may be slightly less than a length of the top surface and the bottom surface, providing for lips that extend outward from the edges of the front surface. The front surface may comprise a second lens orifice 16b extending therethrough. In embodiments, the second lens orifice 16b may be an oval or rounded rectangle. Both the first side surface and the second side surface may be substantially rectangular in shape and may have a depth slightly less than the depth of the top and bottom surfaces, such that the top and bottom surfaces extend past the front surface. The first side surface may comprise a first lens orifice 14b extending therethrough. The first lens orifice 14b may be substantially circular in shape, as shown in the Figures. The second side surface may comprise a second element orifice 18b extending therethrough, wherein the second element orifice may be substantially circular in shape and smaller than the first lens orifice 14b. When in use, the first lens orifice 14b and the second lens orifice 16b may have a first lens 12a and a second lens 12b, respectively, positioned therein.

Figure 1:
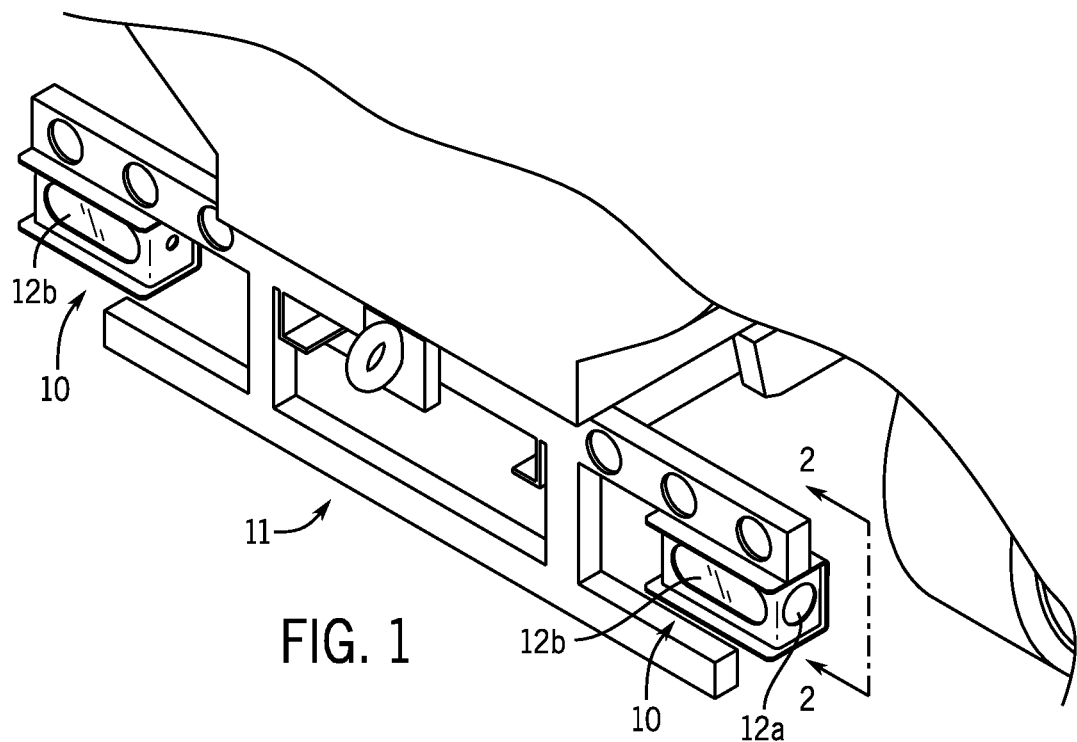
FIG. 1 is a rear perspective view of one embodiment of the present disclosure, shown in use.
Figure 2:
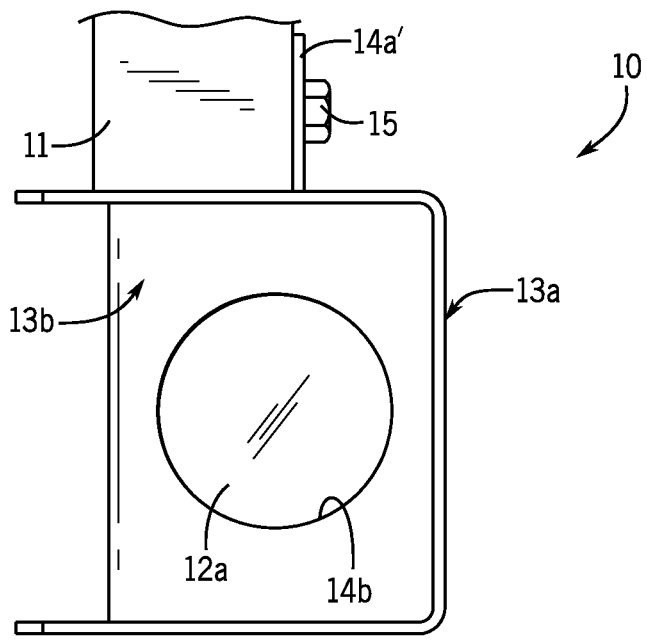
FIG. 2 is a left side elevation view of one embodiment of the present disclosure.
Figure 3:
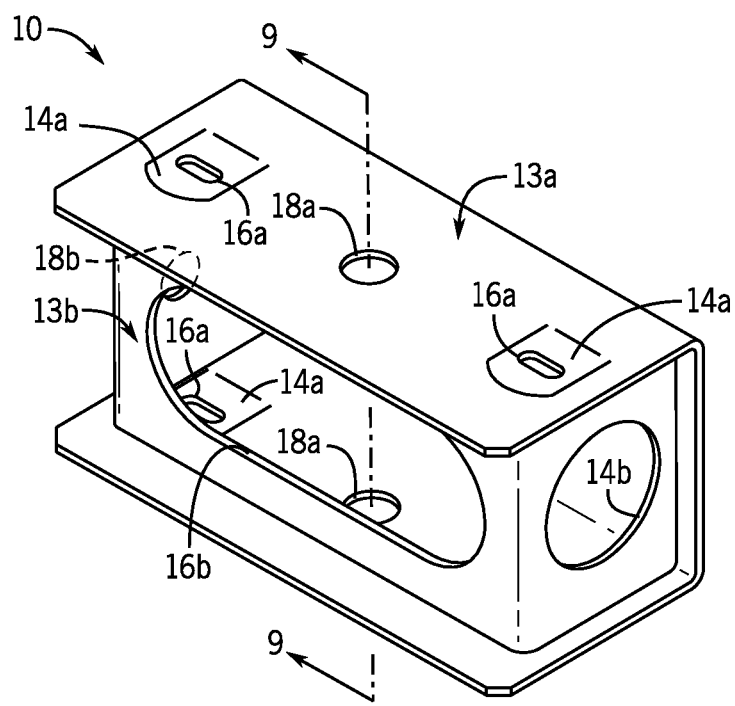
FIG. 3 is a rear perspective view of one embodiment of the present disclosure.

As shown in FIG. 1, when the light box 10 is mounted to a vehicle 11, the first side surface (i.e., the side surface with the first lens orifice 14b may be positioned proximate to an outer edge of the vehicle 11, while the side surface with the second element orifice 18b may be positioned distal from the outer edge of the vehicle. In other words, the first lens 12a may be visible from a side of the vehicle 11.

While the light box 10 is shown and described above as comprising two U-shaped elements 13a, 13b, each surface of the light box 10 may be attached to the other surfaces in any desired way to create the final light box 10.

The light box 10 may comprise any desired materials and, in some embodiments, comprises laser cut metal that is welded together. The light box 10 may be mounted to a vehicle 11 and may be used to hold trailer or vehicle lights within the box 10. Due to the structure of the light box, the light box 10 may be interchangeably used on either side of the vehicle 11. Moreover, due to the structure, the light box 10 may also protect lights from environmental elements and weather. Specifically, the lips (i.e., the amount that the first U-shaped element extend past the second U-shaped element) may provide for additional protection from the environmental elements and weather conditions.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A universal light box for mounting a light to a trailer or vehicle, the universal light box comprising:
    a substantially rectangular light box comprising:
        a top surface,
        a bottom surface parallel to the top surface,
        a front surface attached to and extending between the top surface and the bottom surface,
        a rear surface parallel to the front surface, the rear surface attached to and extending between a rear edge of the top surface and a rear edge of the bottom surface,
        a first side surface attached to and extending between a first side of the top surface and a first side of the bottom surface, wherein the front surface is attached to a front edge of the first side surface and the rear surface is attached to a rear edge of the first side surface, and
        a second side surface parallel to the first side surface, the second side surface attached to and extending between a second side of the top surface and a second side of the bottom surface, wherein the front surface is attached to a front edge of the second side surface and the rear surface is attached to a rear edge of the second side surface;
    a first pair of mounting tabs built into the top surface;
    a second pair of mountain tabs built into the bottom surface;
    a second lens orifice extending through the front surface; and
    a first lens orifice extending through the first side surface, wherein:
        the top surface and the bottom surface each extend outward from the rear surface and past the front surface, creating a lip extending outward from a top edge and bottom edge of the front surface.

2. The universal light box of claim 1, wherein the top surface and the bottom surface are structurally identical.

3. The universal light box of claim 1, further comprising a first element orifice extending through each of the top surface and the bottom surface.

4. The universal light box of claim 1, further comprising a second element orifice extending through the second side surface, wherein the second element orifice is smaller than the second lens orifice.

5. A universal light box for mounting a light to a trailer or vehicle, the universal light box comprising a first U-shaped element engaged with a second U-shaped element,
    wherein:
        the first U-shaped element comprises:
            a top surface;
            a bottom surface parallel to the top surface; and
            a rear surface attached to and extending between a rear edge of the top surface and a rear edge of the bottom surface,
        wherein:
            the top surface and the bottom surface each comprise a pair of mounting tabs built therein;
            a first element orifice extends through each of the top surface and the bottom surface; and
        the second U-shaped element comprises:
            a first side surface;
            a second side surface parallel to the first side surface; and
            a front surface attached to and extending between a front edge of the first side surface and a front edge of the second side surface,
        wherein:
            a second lens orifice extends through the front surface; and
            a first lens orifice extends through the first side surface.

6. The universal light box of claim 5, wherein the second U-shaped element is sized to slide into the first U-shaped element.

7. The universal light box of claim 5, wherein the top surface is structurally identical to the bottom surface.

8. The universal light box of claim 5, further comprising a second element orifice extending through the second side surface.

9. The universal light box of claim 8, wherein:
the first lens orifice is substantially rounded rectangular shaped;
the second lens orifice is substantially circular in shape; and
the second element orifice is substantially circular in shape and smaller than the second lens orifice.

\* \* \* \* \*